United States Patent
Yokohama et al.

(10) Patent No.: US 8,551,204 B2
(45) Date of Patent: Oct. 8, 2013

(54) DUST COLLECTOR

(75) Inventors: Katsuhiko Yokohama, Nagasaki (JP);
Yuichiro Kitagawa, Tokyo (JP);
Masashi Kitada, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 617 days.

(21) Appl. No.: 12/377,574

(22) PCT Filed: Nov. 6, 2006

(86) PCT No.: PCT/JP2006/322122
§ 371 (c)(1),
(2), (4) Date: Feb. 13, 2009

(87) PCT Pub. No.: WO2008/056405
PCT Pub. Date: May 15, 2008

(65) Prior Publication Data
US 2010/0236199 A1 Sep. 23, 2010

(51) Int. Cl.
*B01D 46/02* (2006.01)

(52) U.S. Cl.
USPC .................................. 55/341.1; 55/418

(58) Field of Classification Search
USPC ............ 55/302, 334, 341.1, 341.2, 341.3,
55/341.5, 341.6, 350.1, 379, 413, 418, 282
See application file for complete search history.

(56) References Cited

U.S. PATENT DOCUMENTS

| | | | |
|---|---|---|---|
| 2,391,534 A * | 12/1945 | Yerrick et al. ................... 55/287 |
| 3,092,478 A * | 6/1963 | Smith ............................. 96/373 |
| 3,251,473 A * | 5/1966 | Fuhring ......................... 210/332 |
| 3,513,638 A * | 5/1970 | Young ............................. 96/427 |
| 3,525,199 A * | 8/1970 | Crommelin, Jr. et al. ...... 55/302 |
| 3,541,764 A * | 11/1970 | Astrom ........................... 55/302 |

(Continued)

FOREIGN PATENT DOCUMENTS

| | | |
|---|---|---|
| CN | 1758946 A | 4/2006 |
| DE | 3709671 A1 | 10/1988 |

(Continued)

OTHER PUBLICATIONS

Journal of Autumn Meeting of the Society of Powder Technology, Nov. 1997, pp. 195-198 (content of non-patent literature is the same as "Pall News" npl, both of which are cited in the specification of application).

(Continued)

*Primary Examiner* — Duane Smith
*Assistant Examiner* — Thomas McKenzie
(74) *Attorney, Agent, or Firm* — Lowe, Hauptman & Ham (57) ABSTRACT

A dust collector that collects dust (12) in gas (11) and purifies the gas (11) includes a tube plate (16) being provided in a dust collector frame (13) that separates an interior into a gas introduction chamber (14) and a gas discharge chamber (15), a plurality of dust collection pipes (17) being hung from the tube plate (16) that feeds the gas (11) from outside to inside and removes the dust (12) on a surface thereof, a gas introduction pipe (18) being provided in the gas introduction chamber (14) that includes a gas opening end portion (18a) positioned near the tube plate (16), and supplies the gas (11) to the dust collection pipes (17) in a downflow direction, a diffuser (19) being provided at the opening end portion (18a) of the gas introduction pipe (18), and a gas discharging unit (21) being provided in the gas discharge chamber (15) that discharges purified gas (20).

18 Claims, 14 Drawing Sheets

(56) References Cited

U.S. PATENT DOCUMENTS

| | | | | |
|---|---|---|---|---|
| 3,623,910 | A | * | 11/1971 | Calhoun et al. .................. 134/34 |
| 3,867,116 | A | * | 2/1975 | Muller .............................. 55/319 |
| 3,944,404 | A | * | 3/1976 | Andrasfalvy ..................... 55/294 |
| 4,140,502 | A | * | 2/1979 | Margraf ........................ 55/282.2 |
| 4,231,770 | A | * | 11/1980 | Johnson, Jr. ..................... 55/302 |
| 4,244,715 | A | * | 1/1981 | Eisenbarth ....................... 55/315 |
| 4,261,714 | A | * | 4/1981 | Peterson ....................... 55/341.5 |
| 4,401,446 | A | * | 8/1983 | Johnson, Jr. ..................... 95/286 |
| 4,865,627 | A | * | 9/1989 | Dewitz et al. ...................... 95/12 |
| 4,883,510 | A | * | 11/1989 | Giusti et al. ..................... 55/326 |
| 5,022,897 | A | * | 6/1991 | Balcar et al. ..................... 95/279 |
| 5,030,261 | A | * | 7/1991 | Giusti et al. ..................... 55/326 |
| 5,062,872 | A | * | 11/1991 | Williams ......................... 55/302 |
| 5,158,580 | A | * | 10/1992 | Chang ............................... 95/70 |
| 5,215,557 | A | * | 6/1993 | Johnson et al. ................... 96/52 |
| 5,217,511 | A | * | 6/1993 | Plaks et al. ........................ 96/55 |
| 5,387,406 | A | * | 2/1995 | Ruoff ............................ 423/210 |
| 5,514,195 | A | | 5/1996 | Durst et al. |
| 5,795,359 | A | * | 8/1998 | McLeish et al. ................ 96/233 |
| 5,855,649 | A | * | 1/1999 | Durham et al. ................... 95/71 |
| 5,938,818 | A | * | 8/1999 | Miller ............................... 95/63 |
| 6,290,752 | B1 | * | 9/2001 | Koller et al. ..................... 95/107 |
| 6,350,290 | B1 | * | 2/2002 | Nadeau ............................ 55/302 |
| 6,451,091 | B1 | * | 9/2002 | Avina .............................. 95/107 |
| 6,544,317 | B2 | * | 4/2003 | Miller ............................... 95/63 |
| 6,887,290 | B2 | * | 5/2005 | Strauser et al. ................. 55/283 |
| 6,887,292 | B2 | * | 5/2005 | Thorwesten, Sr. .............. 55/310 |
| 7,300,481 | B2 | * | 11/2007 | Scheuch .......................... 55/302 |
| 7,563,295 | B2 | | 7/2009 | Andersen |
| 7,754,078 | B2 | * | 7/2010 | Gaudfrin ..................... 210/323.1 |
| 2004/0182052 | A1 | * | 9/2004 | Snyder ............................. 55/418 |
| 2005/0120881 | A1 | * | 6/2005 | Sporre et al. .................... 95/280 |

FOREIGN PATENT DOCUMENTS

| | | | |
|---|---|---|---|
| DE | 4212769 | A1 | 10/1993 |
| EP | 0223873 | A | 11/1985 |
| EP | 0314253 | A | 5/1989 |
| JP | 49-69890 | U | 10/1974 |
| JP | 58-163416 | A | 9/1983 |
| JP | 60-114320 | A | 6/1985 |
| JP | 60-168520 | U | 11/1985 |
| JP | 64-070137 | A | 3/1989 |
| JP | 06-047226 | A | 2/1994 |
| JP | 06-114226 | A | 4/1994 |
| JP | 09-262422 | A | 10/1997 |
| JP | 09-294908 | A | 11/1997 |
| JP | 10-000318 | A | 1/1998 |
| JP | 10-028828 | A | 2/1998 |
| JP | 2000-303078 | A | 10/2000 |
| JP | 2002-263427 | A | 9/2002 |
| SU | 1301462 | | 4/1987 |
| WO | 9109662 | A | 7/1991 |

OTHER PUBLICATIONS

Pall News, winter 1998. vol. 83, issued by Nihon Pall Ltd.
PCT/JP2006/322122 International Search Report.
Japanese Patent Office, Office Action issued Jun. 26, 2009.
EP Search Report for EP 06823035.8 Dated Dec. 4, 2009.
Chinese Office Action for Application No. 200680055557.9, dated Sep. 3, 2010.
Chinese Office Action for Application No. 200680055557.9 mailed Jul. 20, 2011.

* cited by examiner

PRIOR ART

FIG.14A

PRIOR ART

104
PRODUCED GAS
(FLOW UPWARD)

FIG.14B

PRIOR ART

104
PRODUCED GAS
(FLOW DOWNWARD)

FIG.15

PRIOR ART

DUST COLLECTOR

RELATED APPLICATIONS

The present application is based on, and claims priority from, International Application PCT/JP2006/322122, filed Nov. 6, 2006, the disclosure of which is hereby incorporated by reference herein in its entirety.

TECHNICAL FIELD

The present invention relates to a dust collector that collects dust (char) that is an unburned portion contained in gas from a gas source such as a coal gasification furnace of a coal gasifier.

BACKGROUND ART

Figure 13:
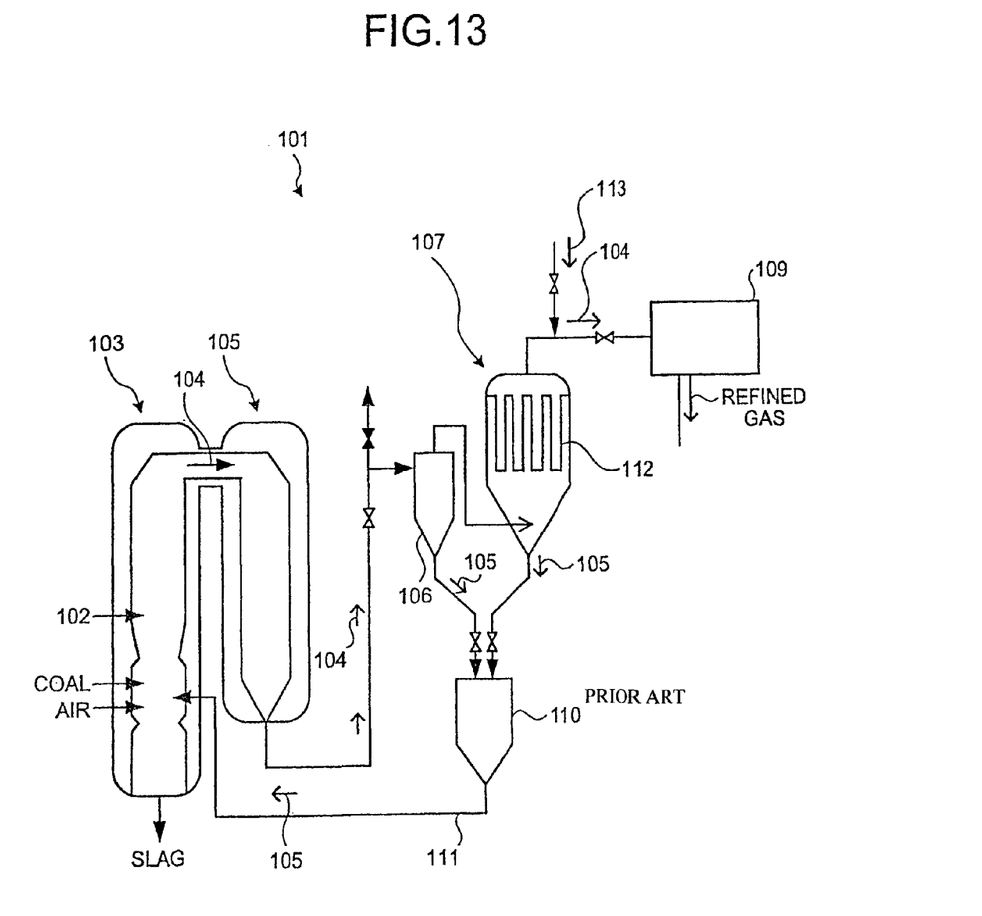
FIG. 13 is a schematic of a coal gasifier.

Integrated coal gasification combined power facilities equipped with a coal gasification furnace include a dust collector that collects dust (char) that is an unburned portion contained in gas produced in the coal gasification furnace. FIG. 13 is an example of a coal gasifier used in the integrated coal gasification combined power facilities. As shown in FIG. 13, a coal gasifier 101 includes a coal gasification furnace 103 that supplies and gasifies a coal 102, a produced gas cooling device 115 that cools produced gas 104 from the coal gasification furnace 103, a cyclone 106 that centrifuges dust (char), which is an unburned portion contained in the cooled produced gas 104, a dust collector 107 that collects the dust (char) 105 remained in the produced gas 104, a gas refinery 109 that refines the purified produced gas into refined gas 108, a hopper 110 that accommodates the dust (char) 105 being separated or collected, and a return pipe 111 that returns the dust from the hopper 110 to the coal gasification furnace 103.

Because the dust 105 is accumulated on the surface of a dust collection pipe 112 in the dust collector 107, reverse cleaning gas 113 is supplied at a predetermined time interval to blow the dust off. The dust 105 being blown off is accommodated in the hopper 110. A reverse cleaning device equipped with a reverse cleaning nozzle is used to remove the dust 105 (Patent document 1).

Figure 14A:
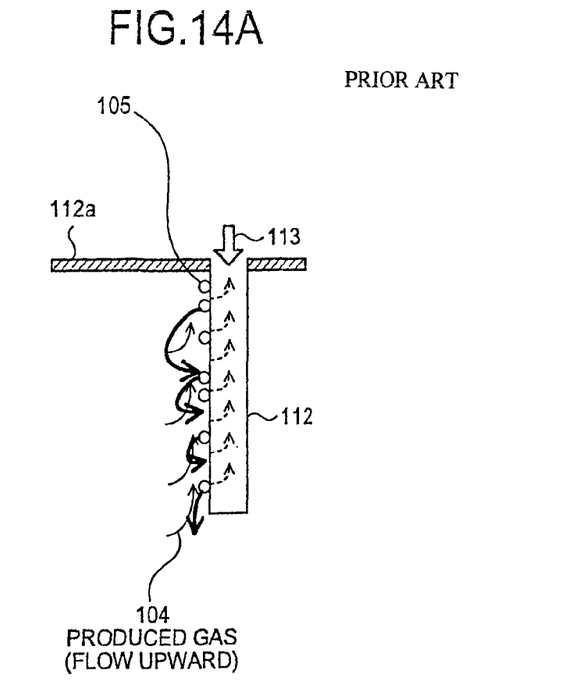
FIG. 14A is a schematic view showing a relationship between produced gas flowing upward and a dust collection pipe.

When the produced gas 104 is introduced from the lower side of the dust collector 107, as shown in a schematic view showing a relationship between produced gas flowing upward and a dust collection pipe in FIG. 14A, there is a problem that the dust 105 removed by the reverse cleaning gas 113 is redeposited on the surface of the dust collection pipe 112, by the produced gas 104 that flows upward from below before falling down.

Figure 14B:
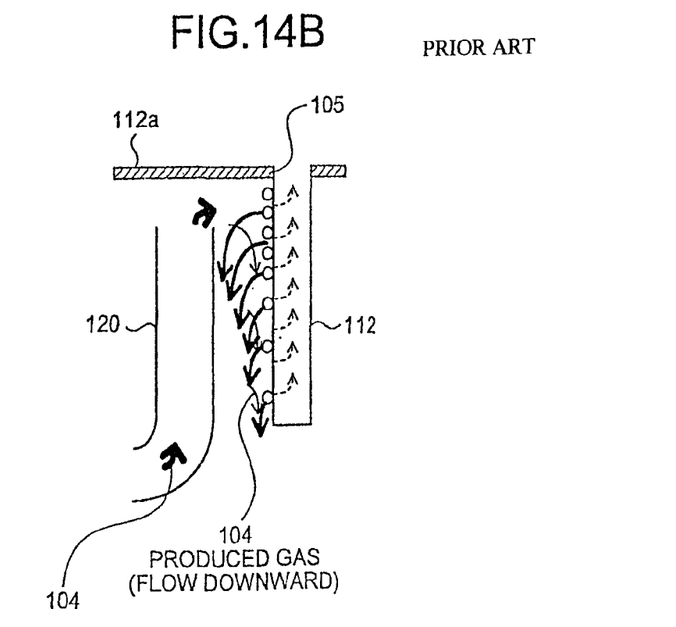
FIG. 14B is a schematic view showing a relationship between produced gas flowing downward and a dust collection pipe.

Accordingly, as shown in a schematic view showing a relationship between produced gas flowing downward and a dust collection pipe in FIG. 14B, a gas introduction pipe 120 that has an opening portion is provided near a tube plate 112a of the dust collection pipe 112. Subsequently, the gas flows downward along the dust collection pipe 112 (Non-patent literature 1 and Non-patent literature 2).

[Patent document 1] Japanese Patent Laid-open Publication No. 2002-263427

[Non-patent literature 1] Pall News, winter 1998, Vol. 83, issued by Nihon Pall Ltd.

[Non-patent literature 2] Journal of Autumn Meeting of the Society of Powder Technology, November 1997, pp. 195-198

DISCLOSURE OF INVENTION

Problem to be Solved by the Invention

However, when the flow rate of the produced gas in which remains a large amount of dust such as char is too fast, the dust 105 in the produced gas 104 may wear a protective coating on the surface of the dust collection pipe 112, thereby corroding a dust collecting unit. This is particularly a problem, for example, when the flow rate is 20 m/s, and when the dust concentration is high, at equal to or more than 1 g/Nm$^3$. In other words, as the gas introduction pipe 120, the concentration is high and the flow rate is fast, near the tube plate 112a. Accordingly, damage may occur due to the impact caused by Karman vortex-induced vibration.

Figure 15:
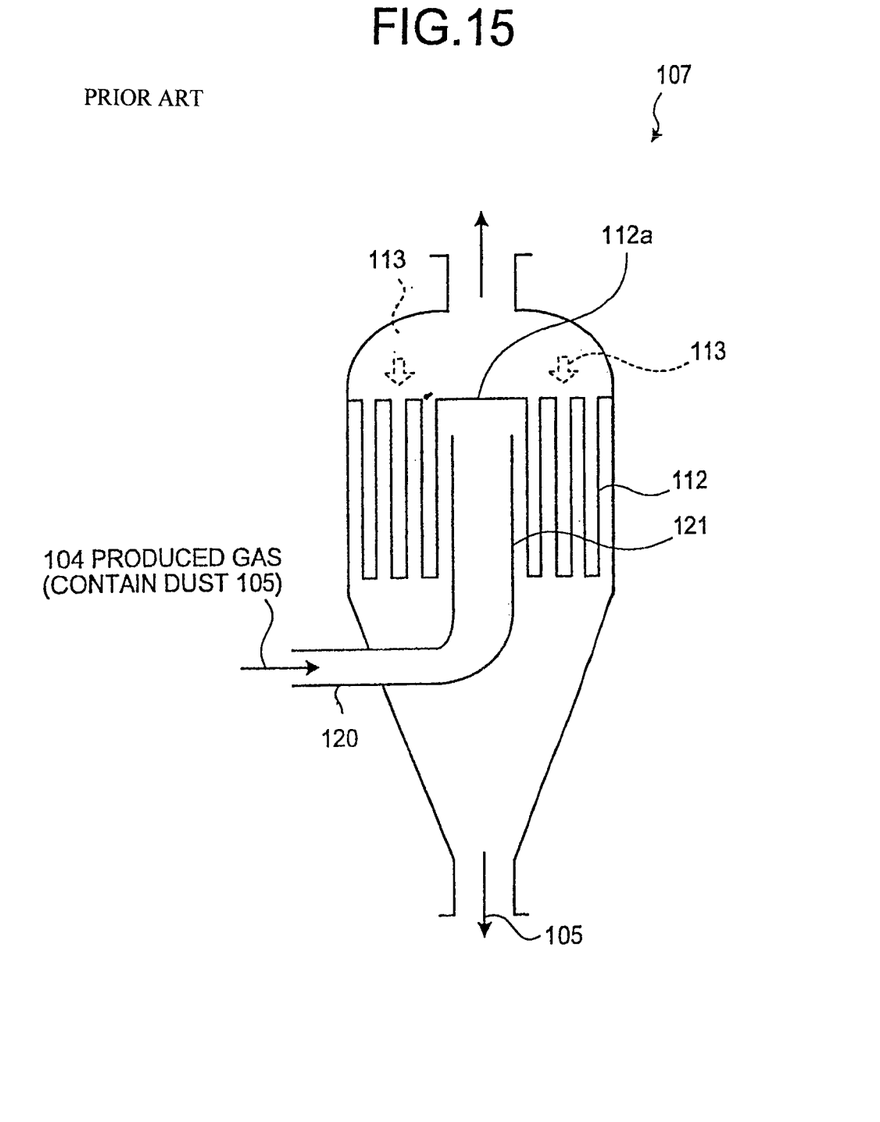
FIG. 15 is a schematic of a conventional dust collector.

Consequently, as shown in FIG. 15, the diameter of the gas introduction pipe 120 may be increased, at an upper portion 121 of the gas introduction pipe 120. However, when the cross-section area of a flow channel is increased, there are problems that the size of the dust collector frame is increased, thereby being uneconomical.

In view of the above-described problems, the present invention provides a dust collector that decreases the flow rate of the produced gas that contains dust colliding with the dust collecting unit, decreases the wear of the dust collecting unit, and decreases the size of the dust collector frame.

Means for Solving Problem

Effect of the Invention

According to an aspect of the present invention, a dust collector that collects dust in gas and purifies the gas includes: a tube plate being provided in a dust collector frame and separating an interior thereof into a gas introduction chamber and a gas discharge chamber; a dust collecting unit being hung from the tube plate, feeding the gas from outside to inside, and removing the dust on a surface thereof; a gas introduction pipe being provided in the gas introduction chamber, including a gas opening end portion positioned near the tube plate, and supplying the gas to the dust collecting unit in a downflow direction; a diffuser being provided at the opening end portion of the gas introduction pipe; and a gas discharging unit being provided in the gas discharge chamber and discharging purified gas.

Advantageously, in the dust collector, an opening ratio of an outlet diameter and an inlet diameter of the diffuser is from 1.2 to 1.4.

Advantageously, in the dust collector, a cone angle of the diffuser is from 20 degrees to 60 degrees.

Advantageously, the dust collector further includes a gas flow dispersing unit in the tube plate that faces an opening of the diffuser.

Advantageously, the dust collector further includes a swirling unit that forms a gas swirling flow in either or both of the diffuser and a gas supply pipe.

Advantageously, the dust collector further includes one or more gas flow dispersion plate between an opening end portion of the diffuser and the tube plate.

Advantageously, in the dust collector, the gas flow dispersion plate is a gas flow dispersion plate in a ring shape.

Advantageously, in the dust collector, the gas introduction pipe is provided at a center of a plurality of the dust collecting units.

Advantageously, the dust collector further includes a reverse cleaning unit being provided in the gas discharge chamber and supplying reverse cleaning gas to the dust collecting unit.

The present invention can decrease the flow rate of the produced gas that contains dust colliding with the dust collecting unit, decrease the wear of the dust collecting unit, and decrease the size of the dust collector frame.

EXPLANATIONS OF LETTERS OR NUMERALS 10A to 10E dust collector
11 gas
12 dust
13 dust collector frame
14 gas introduction chamber
15 gas discharge chamber
16 tube plate
17 dust collection pipe
18 gas introduction pipe
19 diffuser
20 purified gas

BEST MODE(S) FOR CARRYING OUT THE INVENTION

Exemplary embodiments of the present invention are described below in greater detail with reference to the accompanying drawings. It is to be understood that the present invention is not limited to the embodiments and examples. The embodiments and examples include elements that can be easily imagined by those skilled in the art, or substantially the same.

First Embodiment

Figure 1:
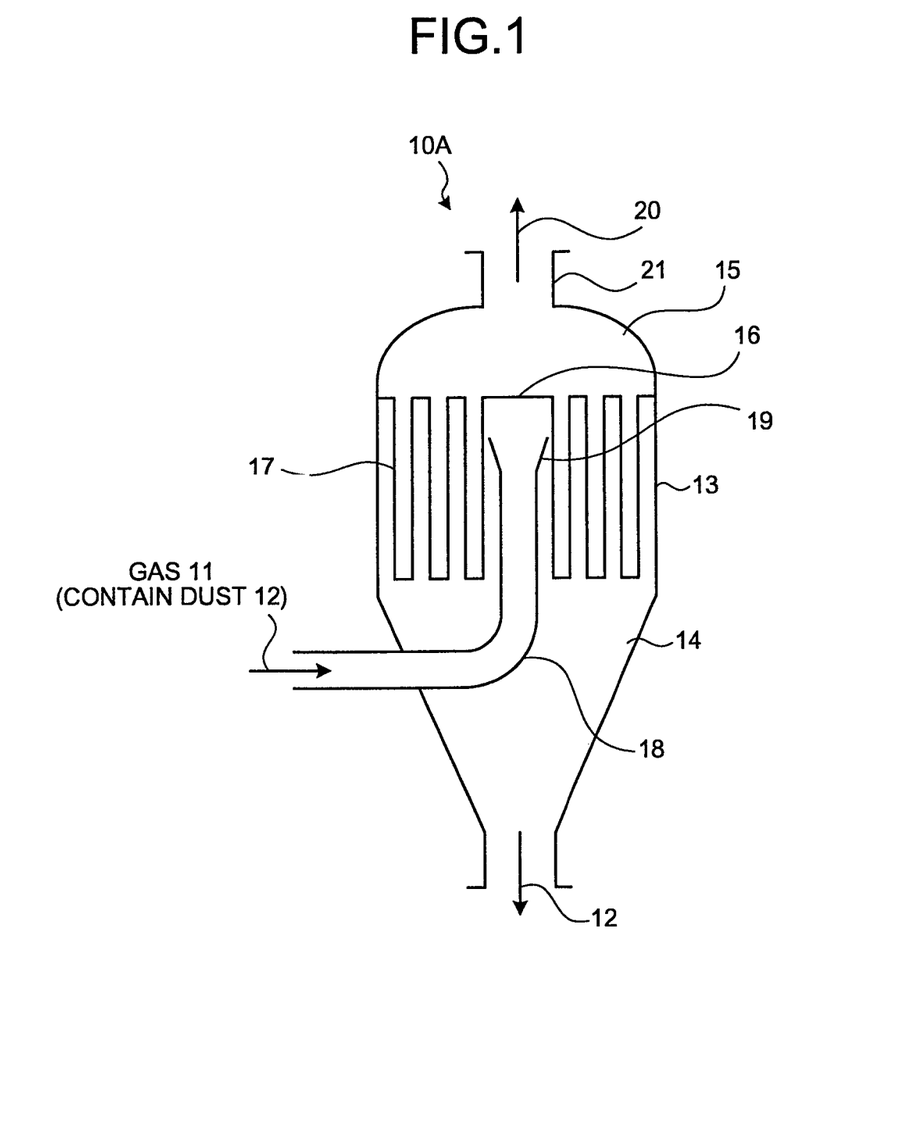
FIG. 1 is a schematic of a dust collector according to a first embodiment.
Figure 2:
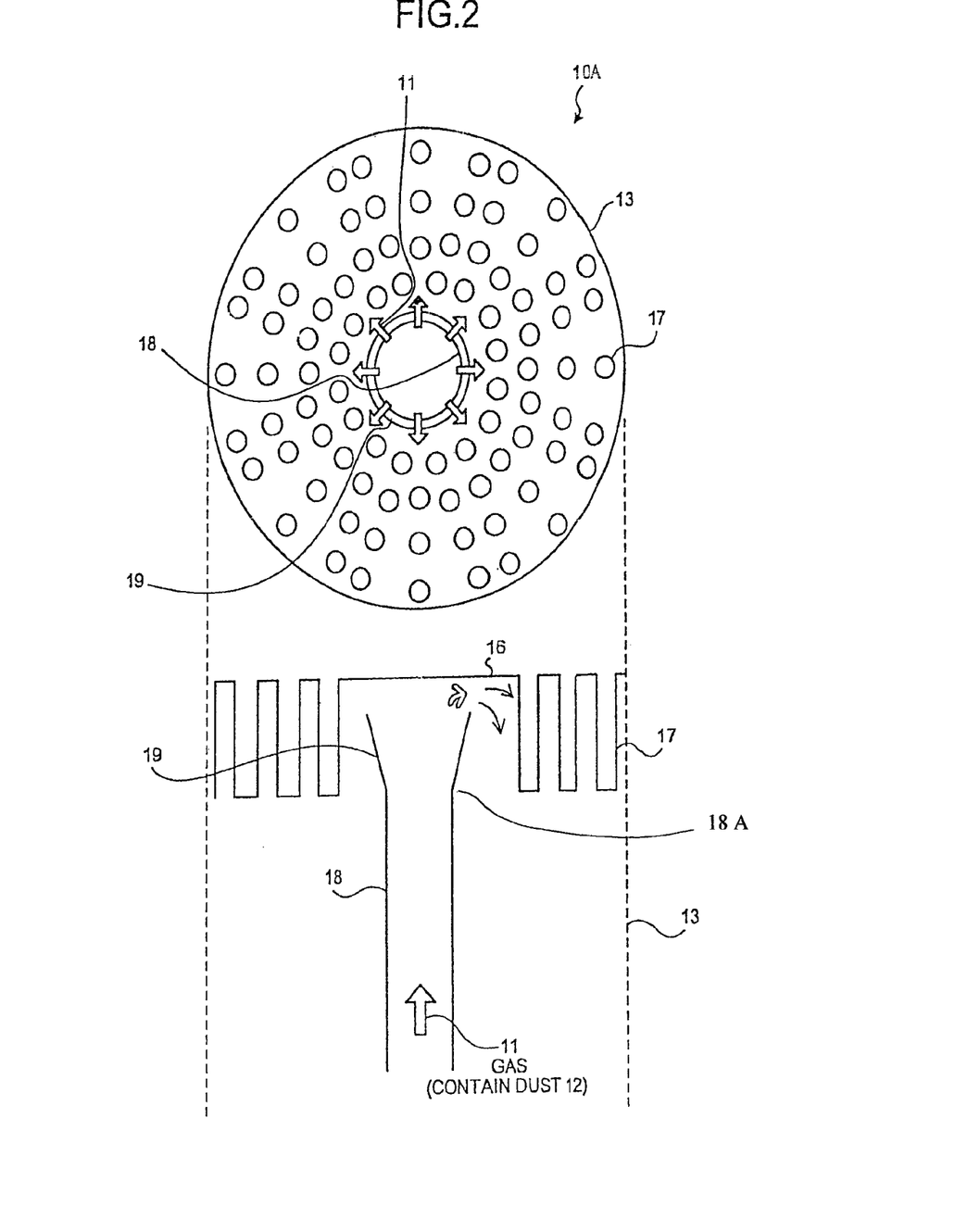
FIG. 2 is a schematic plan view and side view of an essential part of the dust collector according to the first embodiment.

A dust collector according to a first embodiment of the present invention will now be described with reference to the accompanying drawings. FIG. 1 is a schematic of the dust collector according to the first embodiment. FIG. 2 is a plan view and a side view of an essential part thereof. As shown in FIGS. 1 and 2, a dust collector 10A according to the present embodiment is a dust collector that collects dust 12 in gas 11 and purifies the gas 11. The dust collector 10A includes a tube plate 16 being provided in a dust collector frame 13 that separates an interior into a gas introduction chamber 14 and a gas discharge chamber 15, a plurality of dust collection pipes 17 being hung from the tube plate 16 that feeds the gas 11 from outside to inside and removes the dust 12 on a surface thereof, a gas introduction pipe 18 being provided in the gas introduction chamber 14 that includes a gas opening end portion 18a positioned near the tube plate 16, and supplies the gas 11 to the dust collection pipes 17 in a downflow direction, a diffuser 19 being provided at the opening end portion 18a of the gas introduction pipe 18, and a gas discharging unit 21 being provided in the gas discharge chamber 15 that discharges purified gas 20. A reverse cleaning unit being provided at the side of the gas discharge chamber 15 that supplies reverse cleaning gas to the dust collection pipes 17 is not shown.

The diffuser 19 has an opening portion in which the diameter is larger than the diameter of the end portion of the gas introduction pipe 18 at the top thereof, and slows down the flow of the gas 11 introduced into the gas introduction chamber 14 from the gas introduction pipe 18.

In the present embodiment, as shown in FIG. 2, the plurality of dust collection pipes 17 is drooping from the tube plate 16, and arranged radially around the gas introduction pipe 18. By providing the diffuser 19, the flow rate of the gas 11 is slowed down, thereby preventing the dust collection pipes 17 arranged near the gas introduction pipe 18 from being damaged and the like.

It is also possible to decrease a cross-section area of an inlet, and decrease the size of the dust collector frame 13, thereby being economical. The gas 11 treated by the dust collector according to the present embodiment is not limited to the gas that contains char as dust produced by coal gasification, but may be any gas (for example, dust concentration is equal to or more than 1 g/Nm³) that includes a large amount of particles that may damage the dust collection pipe.

Figure 3:
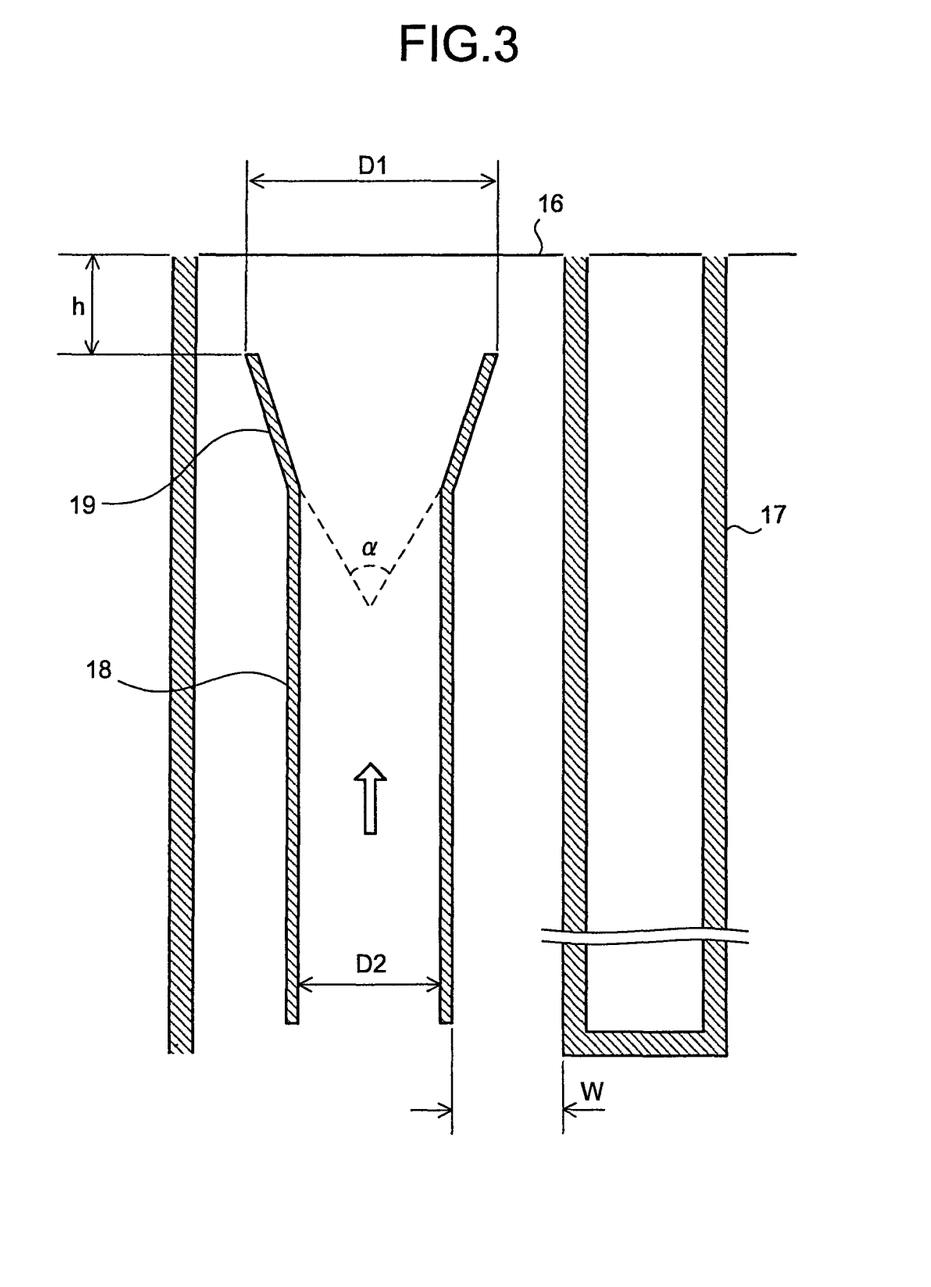
FIG. 3 is a relational diagram between a gas introduction pipe and a diffuser of the dust collector according to the first embodiment.
Figure 4:
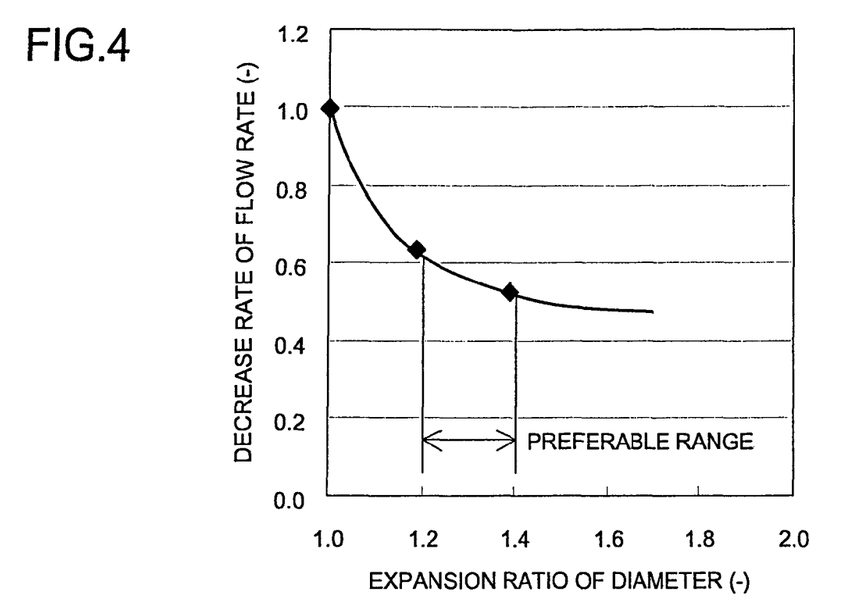
FIG. 4 is a relational diagram between the diameter expansion ratio of the diffuser and the decrease rate of the flow rate.

As shown in FIG. 3, it is preferable that an opening ratio of an outlet diameter D1 and an inlet diameter D2 of the diffuser 19 is from 1.2 to 1.4. This is because, as shown in a relational diagram between the diameter expansion ratio of the diffuser and the decrease rate of the flow rate in FIG. 4, the flow only slows down a little when the opening ratio is equal to or less than 1.2, and the flow does not effectively slow down any more when the opening ratio is equal to or more than 1.4. The flow rate is the fastest flow rate when the gas 11 is abutted to the dust collection pipe 17. An example of a relationship between the diffuser 19 and the gas introduction pipe 18 is shown in FIG. 3, and an opening diameter D1 of the diffuser 19 is 650 mm, a pipe diameter D2 of the gas introduction pipe is 550 mm, and a height h of the tube plate 16 and the diffuser 19 is 430 mm. However, the present invention is not limited thereto. It is preferable that a distance W between the dust collection pipe 17 and the gas introduction pipe is set to a distance so as not to be blocked by the dust in the gas in each dust collector, and may be set appropriately.

Figure 5:
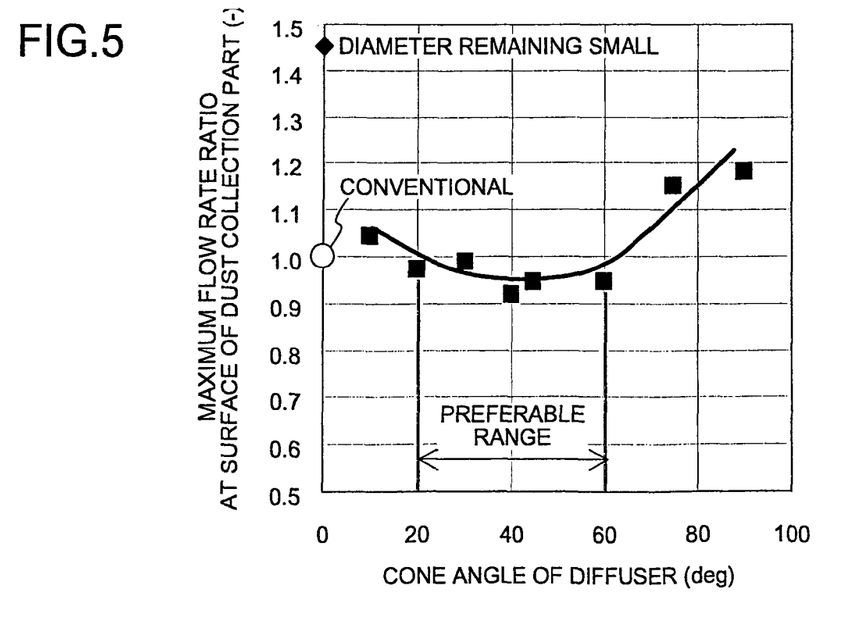
FIG. 5 is a relational diagram between the cone angle of the diffuser and the maximum flow rate ratio at the surface of a dust collection part.

It is also preferable that a cone angle ($\alpha$) of the diffuser 19 is from 20 degrees to 60 degrees. This is because, as shown in a relational diagram between the cone angle of the diffuser and the maximum flow rate ratio at the surface of a dust collection part in FIG. 5, the flow does not effectively slow down when the cone angle is equal to or less than 20 degrees and equal to or more than 60 degrees. In FIG. 5, a white circle printed with "conventional" indicates when the diameter is increased in size without providing a diffuser at the outlet of the introduction pipe, as shown in FIG. 15, and a diamond shape printed with "diameter remaining small" indicates when the diameter of the introduction pipe is remained small without providing a diffuser.

Second Embodiment

Figure 6:
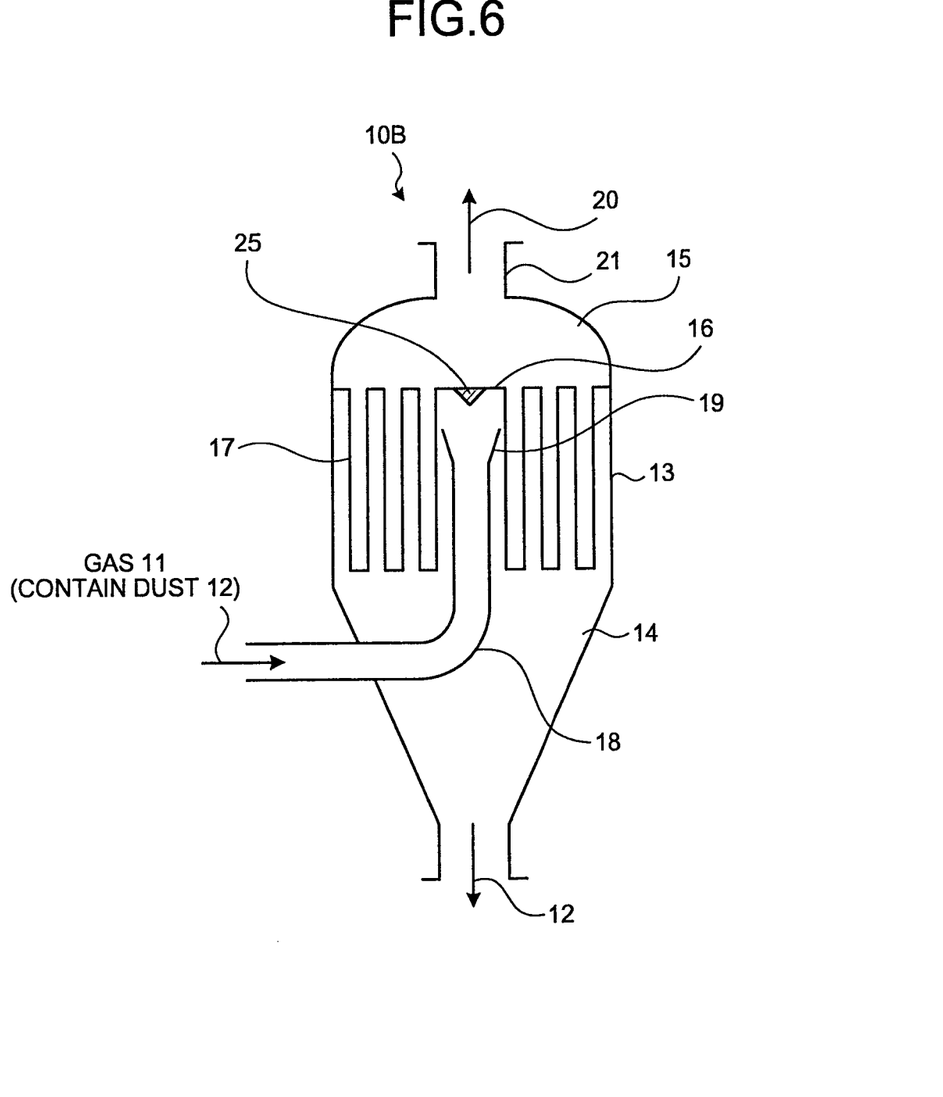
FIG. 6 is a schematic of a dust collector according to a second embodiment.

A dust collector according to a second embodiment of the present invention will now be described with reference to the accompanying drawings. FIG. 6 is a schematic of the dust collector according to the second embodiment. The same members as those of the apparatus of the first embodiment shown in FIG. 1 are denoted by the same reference numerals, and the descriptions thereof will be omitted. As shown in FIG. 6, a dust collector 10B according to the present embodiment includes a gas flow dispersing unit 25 at a rear surface side of the tube plate 16 in the dust collector according to the first embodiment.

By installing the gas flow dispersing unit 25, the flow of the gas discharged from the diffuser 19 becomes uniform, because the gas collides with the gas flow dispersing unit 25. Accordingly, it is possible to decrease the flow rate of the gas that contains dust colliding with the dust collection pipes 17. Because a thick member can be used for the protrusion of the gas flow dispersing unit 25, it is possible to secure resistance against wear caused by the dust contained in the gas 11.

The cross-section of the gas flow dispersing unit 25 shown in FIG. 6 is in a triangular shape. However, the present invention is not limited to this, and may have other shapes, for example, as shown in FIGS. 7A and 7B.

Figure 7A:
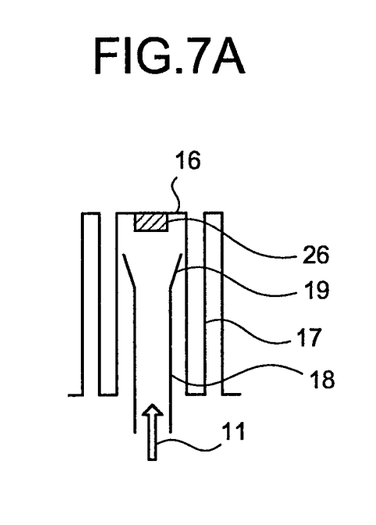
FIG. 7A is a schematic of the dust collector according to the second embodiment that includes another gas flow rate dispersing unit.
Figure 7B:
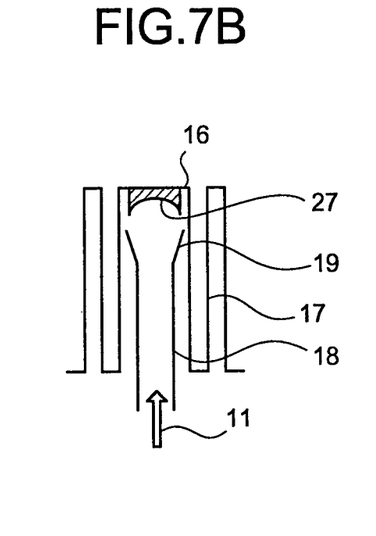
FIG. 7B is a schematic of the dust collector according to the second embodiment that includes another gas flow rate dispersing unit.

A gas flow dispersing unit 26 shown in FIG. 7A is in a rectangular shape. The cross-section of a gas flow dispersing unit 27 shown in FIG. 7B is in a concave lens shape. Any shape other than these may be adopted, as long as the flow of the gas 11 effectively slows down.

Third Embodiment

Figure 8:
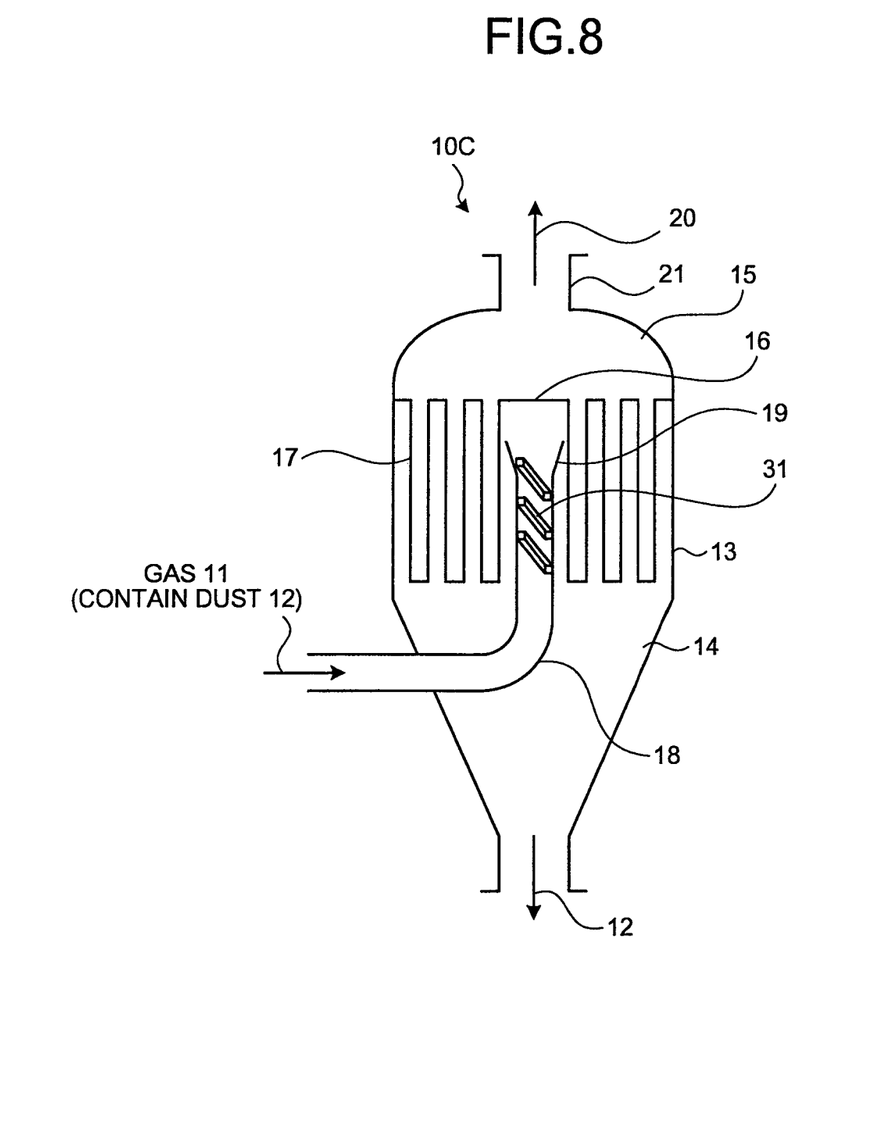
FIG. 8 is a schematic of a dust collector according to a third embodiment.

A dust collector according to a third embodiment of the present invention will now be described with reference to the accompanying drawings. FIG. 8 is a schematic of the dust collector according to the third embodiment. The same members as those of the apparatus of the first embodiment shown in FIG. 1 are denoted by the same reference numerals, and the descriptions thereof will be omitted. As shown in FIG. 8, a dust collector 10C according to the present embodiment includes swirling units 31 inside the gas introduction pipe 18 and the diffuser 19, in the dust collector according to the first embodiment.

The swirling units 31 can include a swirl protrusion in a projected shape therein. By installing the swirl protrusion, the gas 11 swirls in the flow channel and expands at the outlet by centrifugal action, thereby making the gas flow uniform. Accordingly, it is possible to decrease the flow rate of the gas that contains dust colliding with the dust collection pipe 17, which is a dust collection part.

In the present embodiment, the swirling units 31 are formed over both the diffuser 19 and the gas supply pipe 18, but the swirling units 31 may be formed only in one of them.

It is also possible to install the swirling units 31 in addition to installing the gas flow dispersing unit 25 in the second embodiment.

Fourth Embodiment

Figure 9:
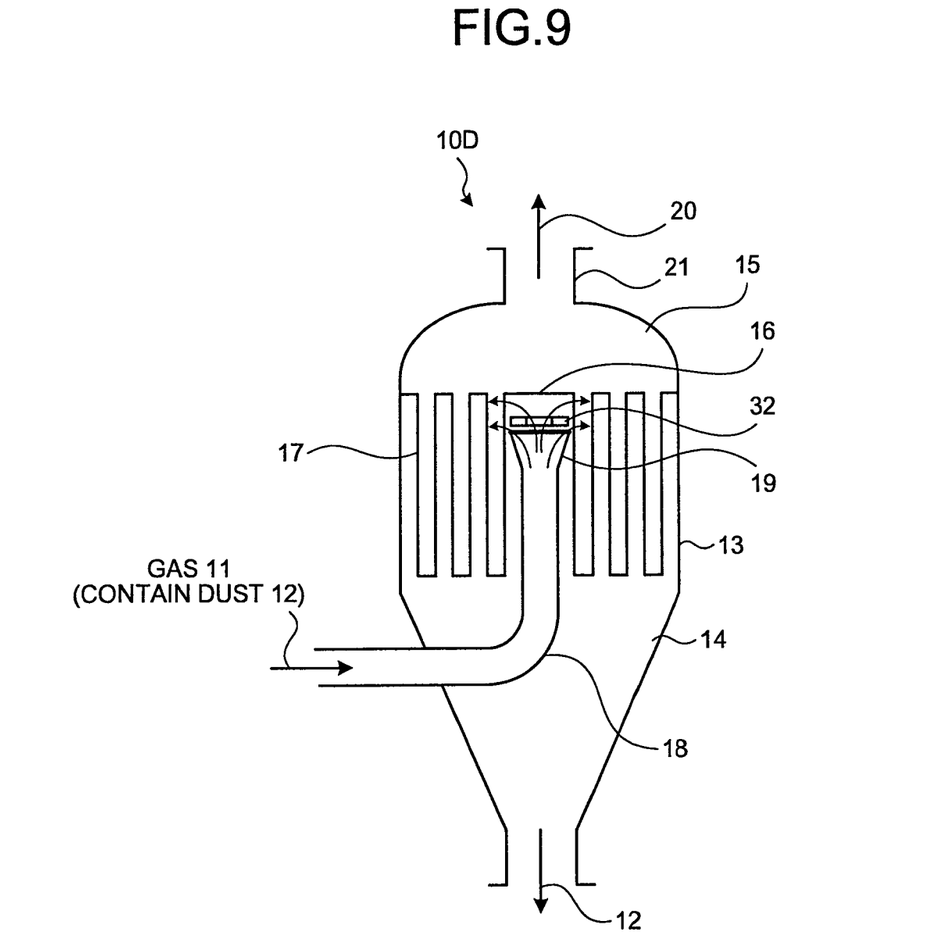
FIG. 9 is a schematic of a dust collector according to a fourth embodiment.

A dust collector according to a fourth embodiment of the present invention will now be described with reference to the drawings. FIG. 9 is a schematic of the dust collector according to the fourth embodiment. The same members as those of the apparatus of the first embodiment shown in FIG. 1 are denoted by the same reference numerals, and the descriptions thereof will be omitted. As shown in FIG. 9, a dust collector 10D according to the present embodiment includes a gas flow dispersion plate 32 in a ring shape between the opening end portion of the diffuser 19 and the tube plate 16, in the dust collector according to the first embodiment.

It is preferable that the outer diameter of the gas flow dispersion plate 32 is approximately the same as the opening diameter D1 of the diffuser 19. It is also preferable that the gas flow dispersion plate 32 is installed at an intermediate position between the tube plate 16 and the diffuser, or towards the opening side to a certain degree from the intermediate position.

By installing the gas flow dispersion plate 32, as shown in FIG. 9, the gas that flows upward discharged from the diffuser 19 collides with the gas flow dispersion plate 32, and distributed to right and left. The gas at the center portion passes through an opening portion 32a provided at the center of the dispersion plate 32, collides with the tube plate 16, and distributed to right and left.

Figure 10A:
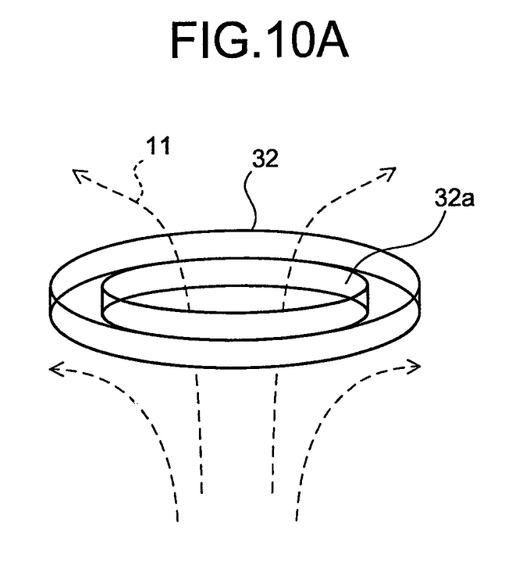
FIG. 10A is a schematic of a gas flow rate dispersion plate according to the fourth embodiment.
Figure 10B:
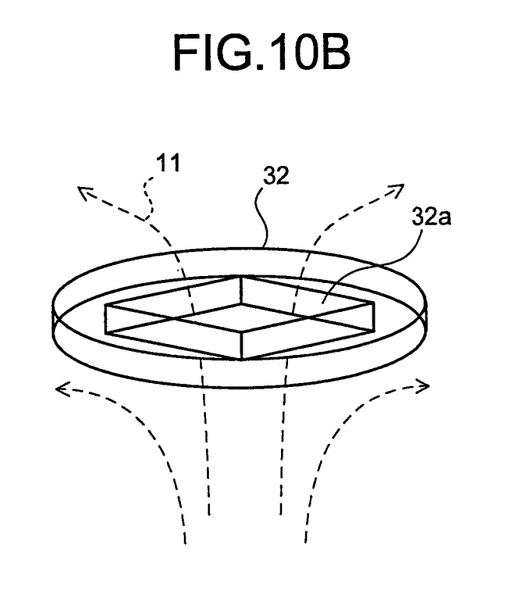
FIG. 10B is a schematic of another gas flow rate dispersion plate according to the fourth embodiment.

At this time, the opening portion 32a at the center of the gas flow dispersion plate 32 may be a circular shape as shown in FIG. 10A, may be a rectangular shape as shown in FIG. 10B, or may be another shape such as an oval.

Figure 11:
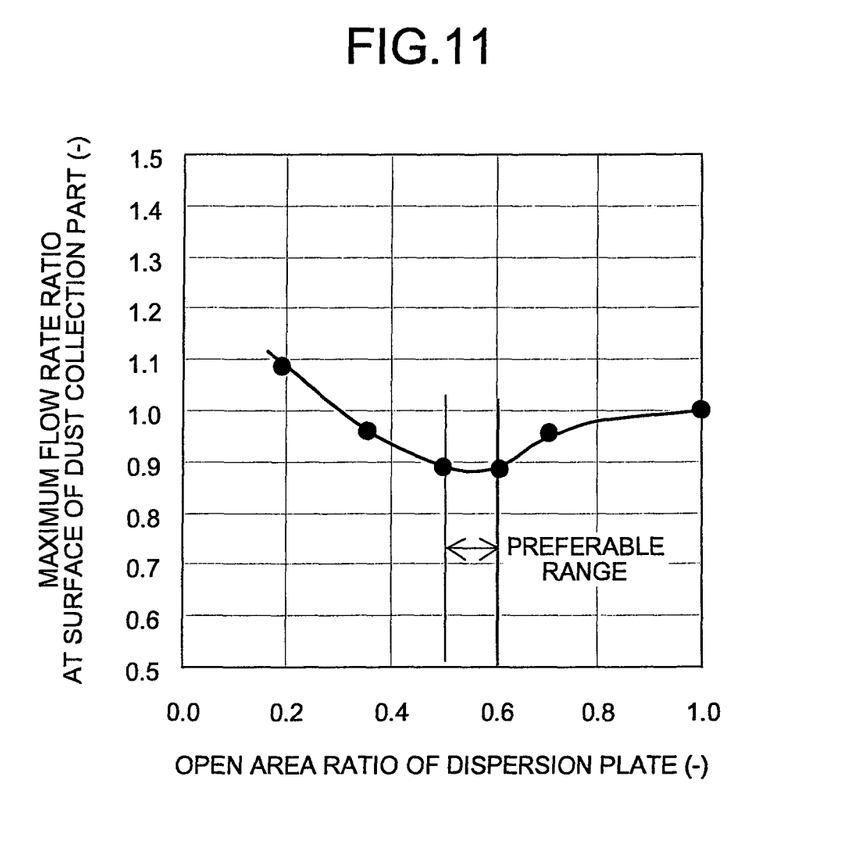
FIG. 11 is a relational diagram between the open area ratio of a dispersion plate and the maximum flow rate ratio at the surface of the dust collection part.

As shown in a relational diagram between the open area ratio of the dispersion plate and the maximum flow rate ratio at the surface of a dust collection part in FIG. 11, it is preferable that the open area ratio of the gas flow dispersion plate 32 is from 0.5 to 0.6, from the flow rate ratio.

Figure 12:
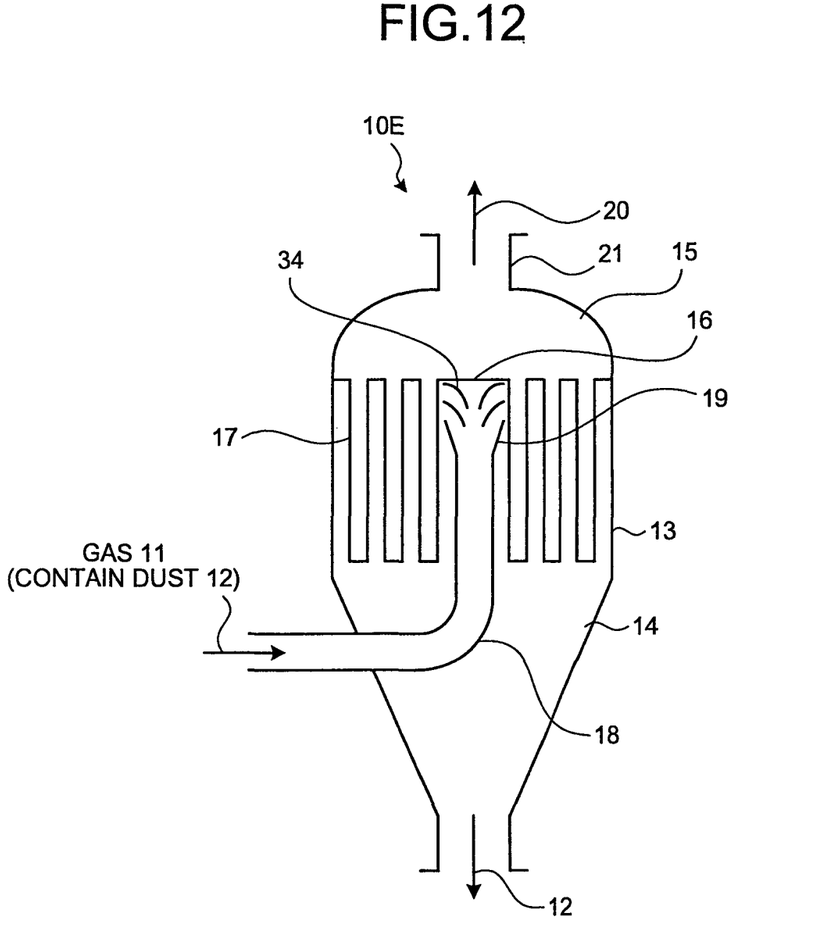
FIG. 12 is a schematic of another dust collector according to the fourth embodiment.

A single gas flow dispersion plate 32 may be installed as shown in FIG. 9, or a plurality of gas flow dispersion plates 34 may be arranged as shown in a dust collector 10E in FIG. 12. The plurality of gas flow dispersion plates may have the same shape and size, or may have different shapes.

INDUSTRIAL APPLICABILITY

In this manner, the dust collector according to the present invention can decrease the flow rate of the produced gas that contains dust colliding with the dust collecting unit, decrease the wear of the dust collecting unit, decrease the size of the dust collector frame, and advantageously used for, for example, a dust collector in a coal gasification furnace system.

The invention claimed is:

1. A dust collector that collects dust in gas and purifies the gas, the dust collector comprising:
   a tube plate being provided in a dust collector frame and separating an interior thereof into a gas introduction chamber and a gas discharge chamber;
   a dust collecting unit being hung from the tube plate, feeding the gas from outside to inside, and removing the dust on a surface thereof;
   a gas introduction pipe being provided in the gas introduction chamber, including a gas opening end portion positioned near the tube plate, and supplying the gas to the dust collecting unit in a downflow direction;

a diffuser being provided at the opening end portion of the gas introduction pipe, an opening ratio of an outlet diameter of the diffuser to an inlet diameter of the diffuser being from 1.2 to 1.4; and a gas discharging unit being provided in the gas discharge chamber and discharging purified gas.

2. The dust collector according to claim 1, wherein a cone angle of the diffuser is from 20 degrees to 60 degrees.

3. The dust collector according to claim 1, further comprising:

a gas flow dispersing unit on the tube plate and facing an outlet of the diffuser, said outlet having the outlet diameter.

4. The dust collector according to claim 1, further comprising:

a swirling unit for forming a gas swirling flow in either or both of the diffuser and a gas supply pipe section of the gas introduction, said gas supply pipe section being connected to an inlet of the diffuser, said inlet having the inlet diameter.

5. The dust collector according to claim 1, further comprising:

one or more gas flow dispersion plates between an outlet of the diffuser and the tube plate, said outlet having the outlet diameter.

6. The dust collector according to claim 5, wherein at least one of the one or more gas flow dispersion plates has a ring shape.

7. The dust collector according to claim 1, wherein the gas introduction pipe is provided at a center of a plurality of the dust collecting units.

8. The dust collector according to claim 1, further comprising:

a reverse cleaning unit being provided at the side of the gas discharge chamber and supplying reverse cleaning gas to the dust collecting unit.

9. The dust collector according to claim 1, wherein the gas opening end portion faces the tube plate.

10. A dust collector for collecting dust in a gas and purifying the gas, the dust collector comprising:

a dust collector frame;

a tube plate being provided in the dust collector frame and separating an interior inside the dust collector frame into a gas introduction chamber below the tube plate and a gas discharge chamber above the tube plate;

a gas introduction pipe being provided in the gas introduction chamber and including a gas opening end portion for introducing the gas to be purified into the gas introduction chamber;

a plurality of dust collecting pipes each of which extends axially downwardly from the tube plate for feeding the gas from an outside to an inside of said pipe, and for removing dust from the gas by collecting said dust on a surface of said pipe;

a diffuser under the tube plate, said diffuser being provided at the opening end portion of the gas introduction pipe, being surrounded by the dust collecting pipes, and being oriented upwardly toward an underside of the tube plate for directing the gas to be purified upwardly at the tube plate for supplying the gas to the dust collecting pipes in a downward flow, wherein an opening ratio of an outlet diameter at an outlet of the diffuser to an inlet diameter at an inlet of the diffuser is from 1.2 to 1.4; and a gas discharging unit being provided in the gas discharge chamber for discharging purified gas.

11. The dust collector according to claim 10, wherein the diffuser is flared upwardly from the inlet to the outlet and configured for decreasing a flow rate of the gas to be purified before colliding with the tube plate and the dust collecting pipes.

12. The dust collector according to claim 10, wherein the diffuser is flared upwardly the inlet to the outlet, and a cone angle as defined by the outlet diameter and the inlet diameter of the diffuser is from 20 degrees to 60 degrees.

13. The dust collector according to claim 10, further comprising:

a gas flow dispersing unit projecting from the underside of the tube plate, downward toward the outlet of the diffuser for colliding with the gas to be purified emerging from the outlet of the diffuser for reducing a flow rate of said gas before said gas contacts the dust collecting pipes.

14. The dust collector according to claim 10, further comprising:

a swirling unit positioned in at least one of the diffuser or the gas introduction pipe for causing the gas to be purified to emerge from the diffuser in a swirl flow.

15. The dust collector according to claim 10, further comprising:

at least one ring-shaped gas flow dispersion plate between the outlet of the diffuser and the tube plate, said ring-shaped gas flow dispersion plate being arranged coaxially with the diffuser.

16. The dust collector according to claim 10, wherein the diffuser is flared about an axis that is directed at a center portion of the tube plate, and the dust collecting pipes are arranged around said center portion.

17. The dust collector according to claim 10, further comprising:

a reverse cleaning unit being provided at the side of the gas discharge chamber for supplying reverse cleaning gas to the dust collecting pipes for blowing the collected dust off said dust collecting pipes.

18. A dust collector for collecting dust in a gas and purifying the gas, the dust collector comprising:

a dust collector frame;

a tube plate being provided in the dust collector frame and separating an interior inside the dust collector frame into a gas introduction chamber below the tube plate and a gas discharge chamber above the tube plate;

a gas introduction pipe being provided in the gas introduction chamber and including a gas opening end portion for introducing the gas to be purified into the gas introduction chamber;

a plurality of dust collecting pipes each of which extends axially downwardly from the tube plate for feeding the gas from an outside to an inside of said pipe, and for removing dust from the gas by collecting said dust on a surface of said pipe;

a diffuser under the tube plate, said diffuser being provided at the opening end portion of the gas introduction pipe and being oriented upwardly toward an underside of the tube plate for directly supplying the gas to be purified upwardly at the tube plate without directly supplying the gas from the diffuser to the dust collecting pipes, wherein an opening ratio of an outlet diameter of the diffuser to an inlet diameter of the diffuser is from 1.2 to 1.4; and a gas discharging unit being provided in the gas discharge chamber for discharging purified gas.

* * * * *